United States Patent [19]

Tomozawa et al.

[11] 3,816,666

[45] June 11, 1974

[54] SYSTEM FOR CHANGING THE BURST FORMAT IN A TDMA COMMUNICATION SYSTEM

[75] Inventors: Atsushi Tomozawa, Gaithersburg; Harold E. Ford, Clarksburg, both of Md.

[73] Assignee: Communications Satellite Corporation, Washington, D.C.

[22] Filed: Oct. 2, 1972

[21] Appl. No.: 293,903

[52] U.S. Cl. .................................. 179/15 BS, 325/4

[51] Int. Cl. .............................................. H04j 3/06

[58] Field of Search ............ 179/15 BS; 178/69.5 R; 325/4

[56] References Cited

UNITED STATES PATENTS

| | | | |
|---|---|---|---|
| 3,546,391 | 12/1970 | Hertog | 325/4 |
| 3,643,031 | 2/1972 | Sasaki | 179/15 BS |
| 3,730,998 | 5/1973 | Schmidt | 179/15 BS |

*Primary Examiner*—Ralph D. Blakeslee
*Attorney, Agent, or Firm*—Sughrue, Rothwell, Mion, Zinn & Macpeak

[57] ABSTRACT

In a satellite transponder communication system operating in a time division multiple access mode, each earth station transmits data in a burst format. Each earth station apparatus is arranged in modular form enabling many forms of data to be included within a station's burst of transmission. Individual terrestrial interface modules receive data, voice, etc. in various forms and convert the data, voice, etc. into bit format suitable for inclusion in the transmitted burst. A multiplexer at the transmitter is controlled by a programmable memory to select and determine the order in which bits are extracted from the various terrestrial interface modules and entered into the bit stream of the transmitted burst. The receiver includes a demultiplexer controlled by a programmable memory to properly demultiplex the bit stream of the received burst and to direct the demultiplexed blocks of bits to respective ones of the terrestrial interface modules. The memories are provided with at least two sections to enable a change in burst format without loss of communications. At the multiplexer one section controls the format while a new program is written into the other section. A similar arrangement is provided at the receiver. A memory status signal is included in the station's burst and this status is detected by the receive stations. When the multiplexer memory is to be switched from one section to another the status signal changes. The status signal is transmitted as part of the signalling portion of the burst preamble.

17 Claims, 7 Drawing Figures

SYSTEM FOR CHANGING THE BURST FORMAT IN A TDMA COMMUNICATION SYSTEM

BACKGROUND OF THE INVENTION

In a time division multiple access satellite communications system each earth station in the network has assigned times for accessing or communicating with the satellite transponder. The times are assigned such that no two bursts of transmission from any two earth stations will arrive at the satellite transponder simultaneously. The bursts are maintained in the proper relative positions by burst synchronization means, located at each earth station, which operate to synchronize the transmission of the earth station's burst to a TDMA frame reference signal. The frame reference signal is included in the burst from one of the earth stations which is designated to perform the reference function.

In the satellite communications art, the earth station operator may not have complete control over the form of the signals presented for transmission via a satellite transponder to distant earth stations. Tnus, for example, the signals may take the form of digital data, voice analog channels, television signals, etc. A TDMA system designed to accept one type of signal and convert it into a form which is compatible with the TDMA frame and bit rates, does not provide sufficient flexibility.

A TDMA system, capable of handling multiple forms of signals, is disclosed in copending application Ser. No. 170,707 filed Aug. 11, 1971 by Schmidt et al. and assigned to the assignee herein. Each form of signal is applied to a separate module which converts the respective signals into the proper form which is compatible with the TDMA frame and bit rates. The signals are held by the modules ready for inclusion in the earth station's burst open request. The timing of bursts and the timing of selection of the signals from the various modules is flexible and can be completely reordered without altering the system hardware. Additionally, future modules for new forms of signal may be added to the system without affecting the existing arrangement of hardware. The earth stations are capable of communicating via multiple satellite transponders, each operating at different up-link and down-link frequencies. The selection of up-link and down-link frequencies, as well as the order of selection of the signals from the modules on the transmit side and the order extraction of signals from received bursts on the received side can be completely rearranged without any hardware changes. The latter arrangement is controlled by programmable non-volatile memories which store words defining the times and functions to be carried out.

In any satellite TDMA network, traffic demand changes from time to time. A station may need additional channels, or replacement of channel equipment for upgraded service. In a TDMA system of the aforementioned application, such needs will involve an addition and/or deletion of one or more subbursts. Such operation is referred to as a burst of format change. This is to be distinguished from a TDMA format change wherein the burst time and /or durations are altered. In a burst format change, it is an essential requisite for the system that the remaining active traffic not be effected during the transition.

The burst format may be changed by altering the programs, or contents of the memories. In the TDMA system of the above-mentioned patent application, however, there is no hardware provision for changing the burst format without affecting presently active traffic. The burst format change will also involve many manual operations. For example, when it is required to add a terrestrial interface module for communicating between two stations, say A and B, the following steps will be necessary to implement the change.

a. New memory contents will be determined for each station according to the desired format. The memories of the multiplexes at stations A and B must be changed. The memories of all demultiplexers must be modified to receive the new bursts from stations A and B.

b. The operators will feed the new data into the memory of their respective local processor as well as connect new terrestrial interface module terminals to the multiplexer and demultiplexers.

c. When the time comes for the change over, the operators will command their local processors to load the new program into their respective multiplexer or demultiplexer memories.

Precision is required in changing the multiplexer memory and the demultiplexer memory to achieve the change over keeping the remainder of the traffic in continuous service. The demultiplexer should be changed when the first change burst arrives at the station. Otherwise, several bursts will be demultiplexed incorrectly, resulting in a loss of information for existing traffic or even a temporary loss in the frame synchronization of the successive lower level communication subsystems. The existing traffic will suffer noise or a temporary loss of continuity. Differences in space segment delay from station to station will make it practically impossible to synchronize two different operations at two distant places. A disadvantage of the prior art, therefore, is that it is almost impossible to change the burst format without affecting the existing traffic.

SUMMARY OF THE INVENTION

In accordance with the present invention, the above-mentioned disadvantage is removed by changing the multiplexer and demultiplexer memories, in a coordinated way. This results in a burst format change without loss of continuity in the remaining traffic regardless of the time delay in transmission.

The invention described herein is an improvement to the invention described in the above-mentioned copending patent application. The multiplexer of a TDMA station includes a memory which is organized in two sections, either of which can be allocated as the active section and the other as the stand-by section. Means are provided for selecting or addressing either one of the memory sections and further means is provided for transmitting the status of the memory, i.e. which section is selected for controlling the burst format, to all receiving stations. The demultiplexer comprises, means for receiving and storing the status of multiplexer memories from remote stations, means for selecting the porper memory section of a demultiplexer memory in response to the received memory status information, and a memory which is composed of multiple pairs of memory sections, one for each remote transmitting station.

Multiplexing and demultiplexing is performed using the active sections of the respective memories. The burst format change is accomplished by changing the selection of the memory sections. The burst format is changed in accordance with the following.

a. New data, or a new program, for the new burst format is written in the stand-by section of the multiplexer memory. New data is also written into corresponding sections of the demultiplexer memories at remote stations.

b. A signal is transmitted from the multiplexer to all participating demultiplexers indicating that there will be a memory change. This signal is transmitted via the signalling channel normally provided in the system for housekeeping purposes.

c. The multiplexer memory sections are switched after a fixed time delay. The delay time between sending out the signal and actually switching memory sections is for compensating for the time necessary to transmit and receive the memory status signal via the signalling channel. Bursts are generated with the new format as soon as the memory sections are switched.

d. Upon reception of the status signal, the demultiplexer memory sections are switched to demultiplex the new burst format.

DETAILED DESCRIPTION OF THE DRAWINGS

Figure 1:
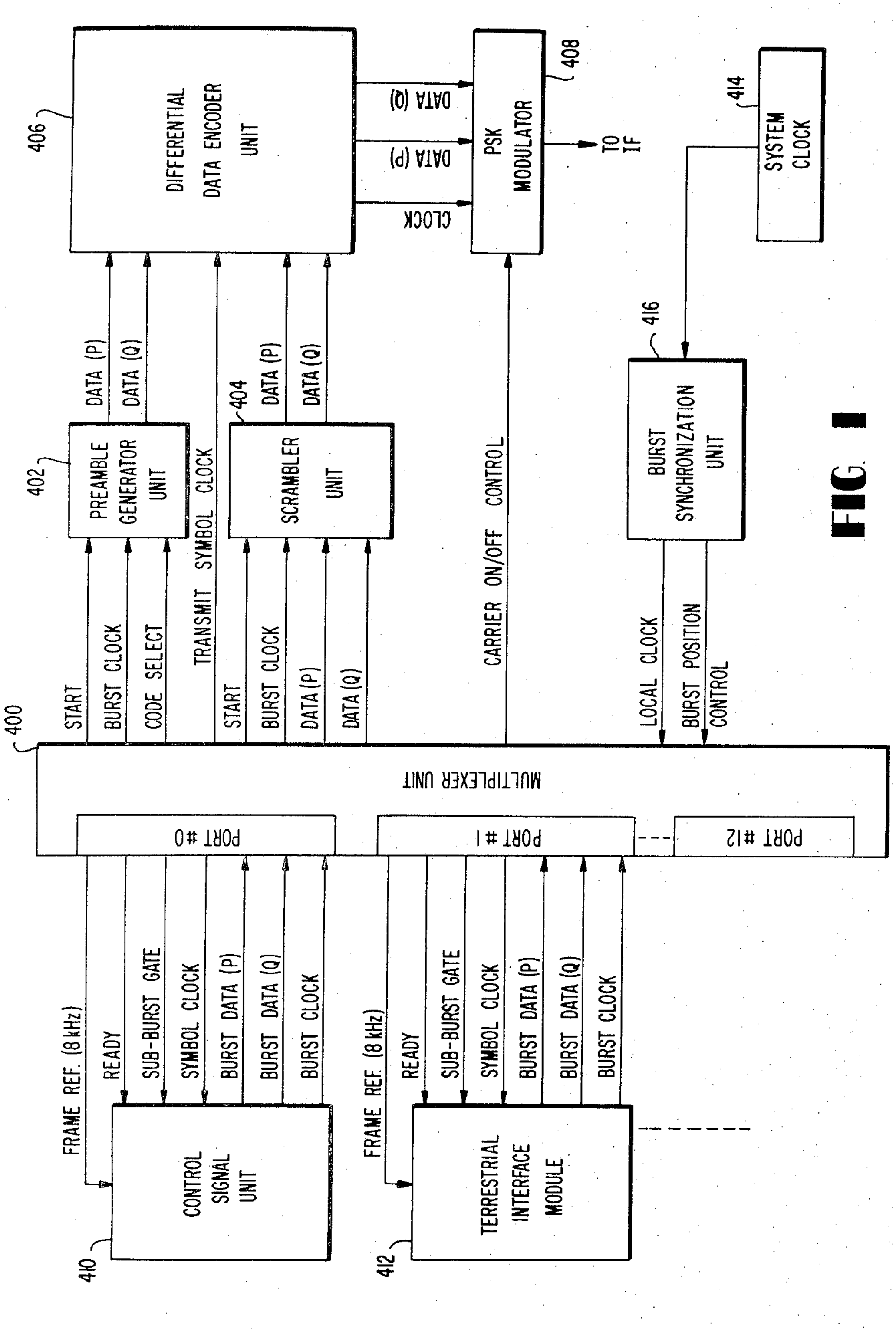
FIG. 1 is a block diagram of the transmit side subsystem of a modular TDMA earth station.

In the detailed description of the preferred embodiment of this invention certain portions of the basic modular TDMA system disclosed in the copending above-mentioned Schmidt et al. application will also be described herein to provide a clearer understanding of the manner in which the subject invention improves the basic modular TDMA system. To accomplish this description certain of the drawings of the basic modular TDMA system are repeated herein with alterations, where necessary, to carry out the improvement of the present invention. Where alterations exist, they will be clearly pointed out.

One important point to keep in mind in reading this explanation of the subject invention is that it is concerned with changing the format within a station burst. It is not concerned with changing the relative timing of bursts among the various stations in the TDMA system. Other apparatus, not a part of the subject invention, is known for accomplishing the latter purpose.

Also, for the purpose of describing the present invention, it will be assumed that there are five stations A, B. C, D, and E which communicate with each other via an earth station satellite. It will also be assumed that station B is required to change the format within its burst. The reason for this requirement could be that an additional terrestrial interface unit will be added to station B to include an additional subburst of data within the burst of station B. If there is available space within the station B burst, the added subburst could be inserted in that space. This may not be possible and it will be necessary to reorder other subbursts within the burst.

As explained in the above-mentioned application, reordering the subbursts within a burst can be simply accomplished by reprogramming the multiplexer memory (the demultiplexer memories also will have to be correspondingly reprogrammed). This flexibility is not altered by the present invention. The present invention provides a simple way of accomplishing change over from one program (format of a burst) to another program without causing equipment down time or loss of synchronization.

Basically, the memories involved are divided into two parts, referred to herein as active and stand-by. The active part of the memory will be operating in the manner described in the above-mentioned application to control the format of data within a station burst. If that format is to be changed for any reason a new program is written into the stand-by section of the multiplexer memory. A corresponding program is written into stand-by sections of the demultiplexer memories of the other stations. When change over is to be accomplished a memory status bit is entered into the signalling portion of the station's preamble. Also the stand-by memory becomes the new active memory and the active memory becomes the new stand-by memory. At the receivers a corresponding operation takes place when the memory status bit is detected.

The TDMA equipment at each earth station includes three basic subsystems which are referred to as the transmit side subsystem, the receive side subsystem, and the control subsystem. Very generally, the transmit side subsystem extracts the data blocks from the TIM units at the proper subburst times, adds the preamble information, and transmits the entire station burst at the appropriate time. The receive side subsystem receives all station bursts via the transponder, extracts the data destined for the local earth station, separates the subbursts in the received data, and sends the subbursts to the appropriate TIM units. The common control subsystem operates to maintain the station burst at the proper position and in synchronism with the TDMA frame reference, provides for burst acquisition when synchronization is lost or when the station is first entering the frame, and provides other housekeeping and signalling functions.

A general block diagram of the transmit side subsystem with connection to the other elements is illustrated in FIG. 1 and comprises a multiplexer unit 400, a preamble generator unit 402, a scrambler unit 404, a differential data encoder unit 406, and a PSK modulator 408. The output from the PSK modulator 408 is a stream of four phase PSK modulated IF, which is sent to an up converter which converts the four phase PSK IF into the proper uplink transponder frequency for transmission to the satellite. The PSK modulator is turned on at the beginning of the burst and turned off at the end of the burst under control of a burst synchronization unit 416 which is part of the common control subsystem. The burst synchronization unit 416 is under the control of a system clock 414. The multiplexer unit 400 is illustrated as having thirteen ports, 0–12, for accomodating twelve TIM units 412 and one control signal unit 410. The control signal unit is a system known in the prior art and is part of the common control subsystem. As far as the multiplexer unit is concerned the control signal unit 410 looks just like another TIM unit since it merely presents a block of bits ready for selection at the command of the multiplexer unit. However, unlike the TIM units, the block of bits presented by the control signal unit comprises the signalling information as is well known in the art.

Since the system described in the example is a four phase PSK system, all transmission of bits is via two channels, hereinafter designated, respectively, as the P and Q channels. The burst synchronization unit 416 sends a start signal to the multiplexer unit 400 along with a local clock at the symbol rate of 30 mega bits per second. At the start of the burst transmission time, the multiplexer unit initiates the preamble generator unit 402. Basically, the preamble generator unit 402 generates the carrier and symbol recovery timing as well as the regular or reference unique word. A preamble generator is somewhat a misnomer because it generates only a portion of what is commonly referred to as the preamble. The preamble includes the carrier and symbol timing recovery, the 20 bit unique word, plus an additional 28 bits (14 symbols) of station identification, signalling, and housekeeping functions. However, the latter 28 bits are not generated by the preamble generator unit 402 but instead come from the control signal unit. For the present purpose it is sufficient to understand that the station identification code and the other signalling and housekeeping data is stored as a block in the control signal unit ready for extraction by the multiplexer unit. When the last symbol of the unique word has been generated by the preamble generator unit 402, multiplexer unit 400 sends a subburst gate and a symbol clock to the control signal unit 410. During the duration of the subburst gate, the block of bits in the control signal unit passes through to the scrambler unit 404. As previously described, this data appears on the P and Q channels. The symbol clock also appears at the output of the control signal unit as the burst clock and is also applied to the scrambler unit. The TIM units 412 are controlled in exactly the same way. That is, at the proper respective times a subburst gate and the symbol clock are applied to the respective TIM unit causing a read out of the respective P and Q channels of data along with the burst clock. This data and clock is applied through the scrambler unit. As illustrated in the figure; each TIM 412 and the control signal 410 also receive a frame reference signal and a ready signal. The frame reference signal is the same for all TIMS and the control signal unit 410 and merely synchronizes the units 412 and 410 to the TDMA frame. This is necessary since the data extracted from any given TIM unit during a single subburst corresponds to the data received and converted by the TIM unit during the entire previous frame. The frame reference signals consequently are used to segregate the data bits in the TIM into individual blocks for transmission during a single subburst. The ready signals are merely warning signals to the units 412 and 410 which occur 8 symbols in advance of the start of the subburst gate for the respective unit 410 or 412. The subburst gates occur sequentially and consequently the blocks of data from the respective TIM units will appear at the input of the scrambler unit 404 in preassigned non-overlapping sequence. The scrambler unit 404 is a known device and its purpose is to impart a more nearly random nature to the transmitted bit stream thus providing a more evenly distributed power spectrum at the PSK modulator (408) output. Essentially, the scrambler unit comprises a pseudoramdom code generator for generating a long pseudorandom bit code and an exclusive OR circuit for adding the pseudo-random code modulo-2 to the input data. The reverse of the scrambler unit, a descrambler unit appears at the receive side.

The data from the preamble generator unit 402 and the scrambler unit 404 are applied to the differential data encoder unit 406. This also is a known device. The purpose of the differential data encoder unit is to add coding to the data channels to distinguish the P channel from the Q channel.

As pointed out above, the preamble generator 402 generates 48 bits (24 symbols) of carrier aand symbol timing followed by a 20 bit (10 symbol) unique word. For those stations which may serve as the reference station, there are four possible 20 bit unique words which may be generated. For those stations which are not equipped to serve as the reference station, there are only two possible unique words which may be generated. Of the four possible 20 bit unique words, two are considered primary and two are considered secondary. The first primary unique word is the reference unique word which has been referred to above. The reference unique word nominally appears in every reference burst transmitted from the reference station. We say it nominally appears because, periodically, the complement of the reference unique word is substituted for the reference unique word in the reference burst. The complement of the reference unique word is one of the two secondary unique words and as pointed out in the above-mentioned copending application, it may be used to assign separate acquisition times to the various earth stations in the TDMA system.

The secondary primary unique word is the nonreference or regular unique word which nominally appears in every regular station burst. The remaining unique word is the complement of the regular unique word. This is periodically substituted for the regular unique word in the regular station burst. The complement of the regular unique word serves as a reference for submultiplexing. For example, some of the housekeeping or signalling data may be submultiplexed over a plurality of frames, e.g. 8 frames, and thus some means is needed for providing a reference for the submultiplexing.

Figure 2:
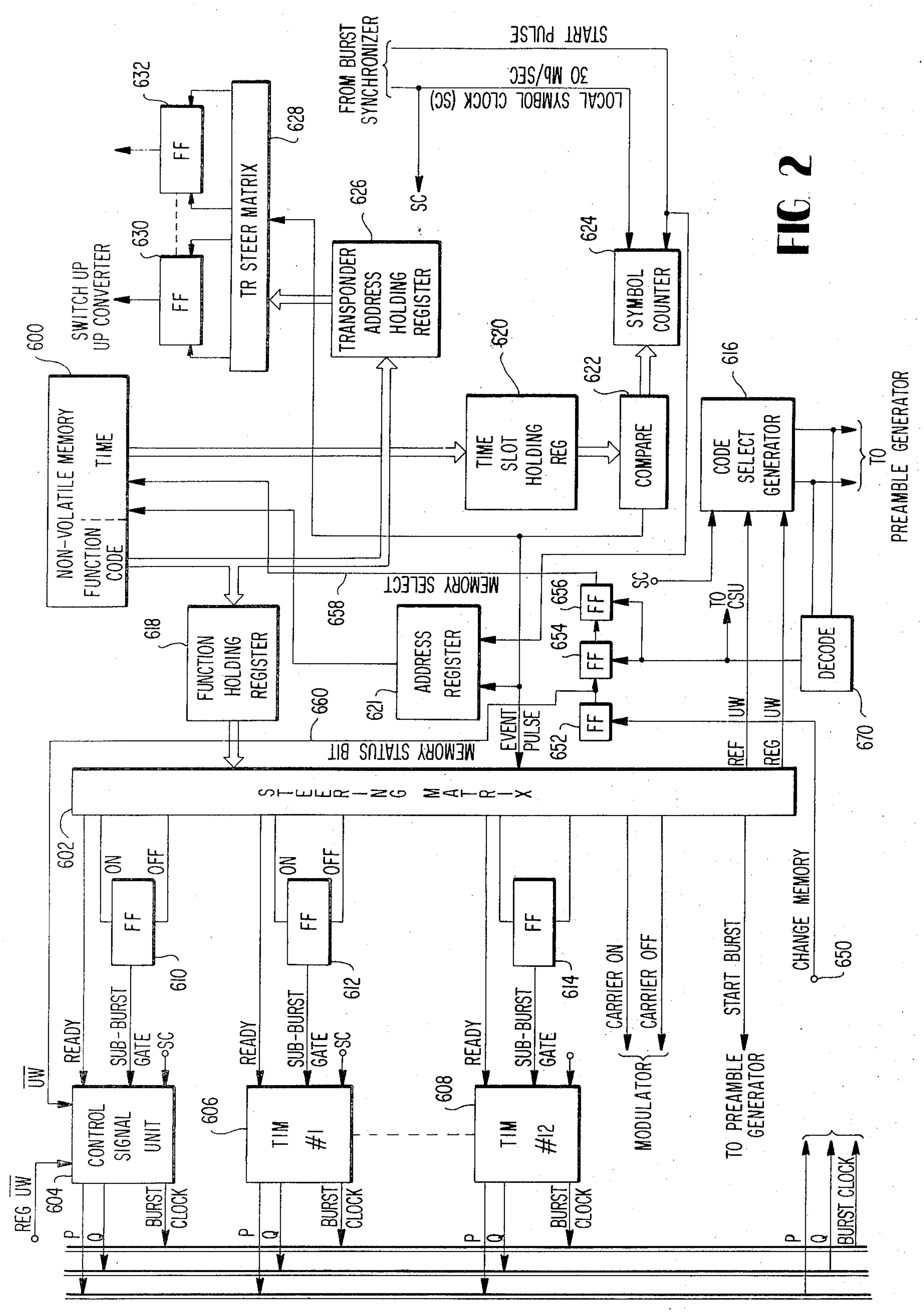
FIG. 2 is a block diagram of the multiplexer of the transmit side subsystem plus the logic for accomplishing the selection of the multiplexer memory sections.

A block diagram of a multiplexer suitable for use in the transmit side subsystem is illustrated in FIG. 2, along with a control signal unit and several TIM units. The multiplexer extracts the blocks of data presented to it by the TIM units and arranges the blocks in subbursts within the station burst. The subburst time for each block of TIM data relative to the start of the burst is a priori information. The multiplexer monitors time from the synchronized start pulse and during the appropriate known times starts and stops a subburst gate which is directed to a particular TIM unit. The multiplexer is very flexible because the timing of bursts and subbursts, the selection of unique words and the frequency is under control of words stored in a memory.

The multiplexer of FIG. 2 includes a non-volatile memory 600 which stores multiple words therein and sequentially presents the stored words to output register 618 and 620 under control of an address register 621. The combination of stored words constitutes a program.

Each word contains two fields, a time field which defines the time at which a function is to be carried out, and a function code field which defines the function or functions to be carried out. Examples of functions are; gate on TIM No. 1, gate off TIM No. 1, turn carrier on, select reference unique word, turn on up converter No. 4, etc.

The words are stored in and read from the memory in the order that the functions are to be performed. The memory time period or recycle period begins with the synchronized start pulse from the burst synchronizer. The latter pulse resets a symbol counter 624 and clears address register 621. The first word is read out under control of the address register. The function code field is entered into the function holding register 618, and the time field is entered into the time slot holding register 620. The symbol counter counts the local symbol clock pulses, and a compare means 622 provides an event pulse whenever the time field held in the register 620 equals the time accumulated by the symbol counter 624.

The event pulse then passes through a steering matrix 602 under control of the function code to one or more of the steering matrix output lines to intiate one or more of the functions. The steering matrix may be a conventional device which gates an input to one or more selected outputs under control of a code which operates gates within the matrix. The functions performed by the outputs are readily apparent. For example, the output pulse may read, start or stop the sending of a block of data from a TIM unit to the scrambler. The output pulse may turn on or off the modulator. The output pulse may signal the start of a burst by being applied to the preamble generator. The output pulse may also indicate whether the burst is to be a reference burst or a regular burst by its appearance on either of the two inputs to the code select generator 616.

The event pulse also steps the address register 621 thereby causing read out from memory 600 of the next word in the sequence. Thus it can be appreciated that the order of events at the transmitter can be completely revised by a mere reprogramming of the words stored in the memory 600. As will be seen later, comparable memories in the receive side subsystem allow the same flexibility in the selection and distribution of incoming bursts.

The logic necessary for the multiplexer to control switching of the up-converters includes a transponder address holding register 626, a transponder steering matrix 628, and flip flops 630. The additional logic operates in a substantially identical manner to the function holding register 618 and the steering matrix 602. However, in this case the address which is read out of the non-volatile memory 600 represents a specified output line from the steering matrix 628 which either turns on or off one of the flip flops 630 to gate on a selected frequency up-converter. The timing of the transponder gates is controlled by the time field of the words within the non-volatile memory 600.

The code select generator 616 may be any simple device which provides a two bit output code to the preamble generator for selection of one of the four possible unique words. As an example, the generator 616 may include a pair of counters, one for the reference unique word and one for the regular unique word. When the matrix output 602 indicates reference unique word, the code generator puts out a fixed code, e.g. 00. However, every Nth reference unique word received by the generator 616 results in a different code, e.g. 01, which represents the complement of the reference unique word. The same kind of code generation applies to the regular and complement of the regular unique words, except that N will not necessarily be the same for the reference and regular indications.

In order to change the format of the station's burst one need only place a new program into memory 600. However, in order to avoid system down time and loss of information when changing to the new program a means must be provided to smoothly accomplish the program changeover. The part of the program switching logic which is connected to the system of FIG. 2 includes flip flops 652, 654, and 656, and decoder 670. This logic will be explained in more detail following an explanation of the receive side and control system of the station.

For the present, it should be understood that memory 600 is divided into two memory portions. That portion which contains the program that is presently controlling the burst forward is referred to as the active memory. The other portion is the stand-by memory. As additional line 658 addresses either the active or stand-by memories. For example, when line 658 carries an "0" bit the active memory is addressed by the contents of the address register 621. When line 658 carries a "1" bit the stand-by memory is addressed by the contents of the address register 621.

Prior to switching to a new program, the new program may be written into the stand-by memory without interfering with the multiplexer operation.

Figure 3:
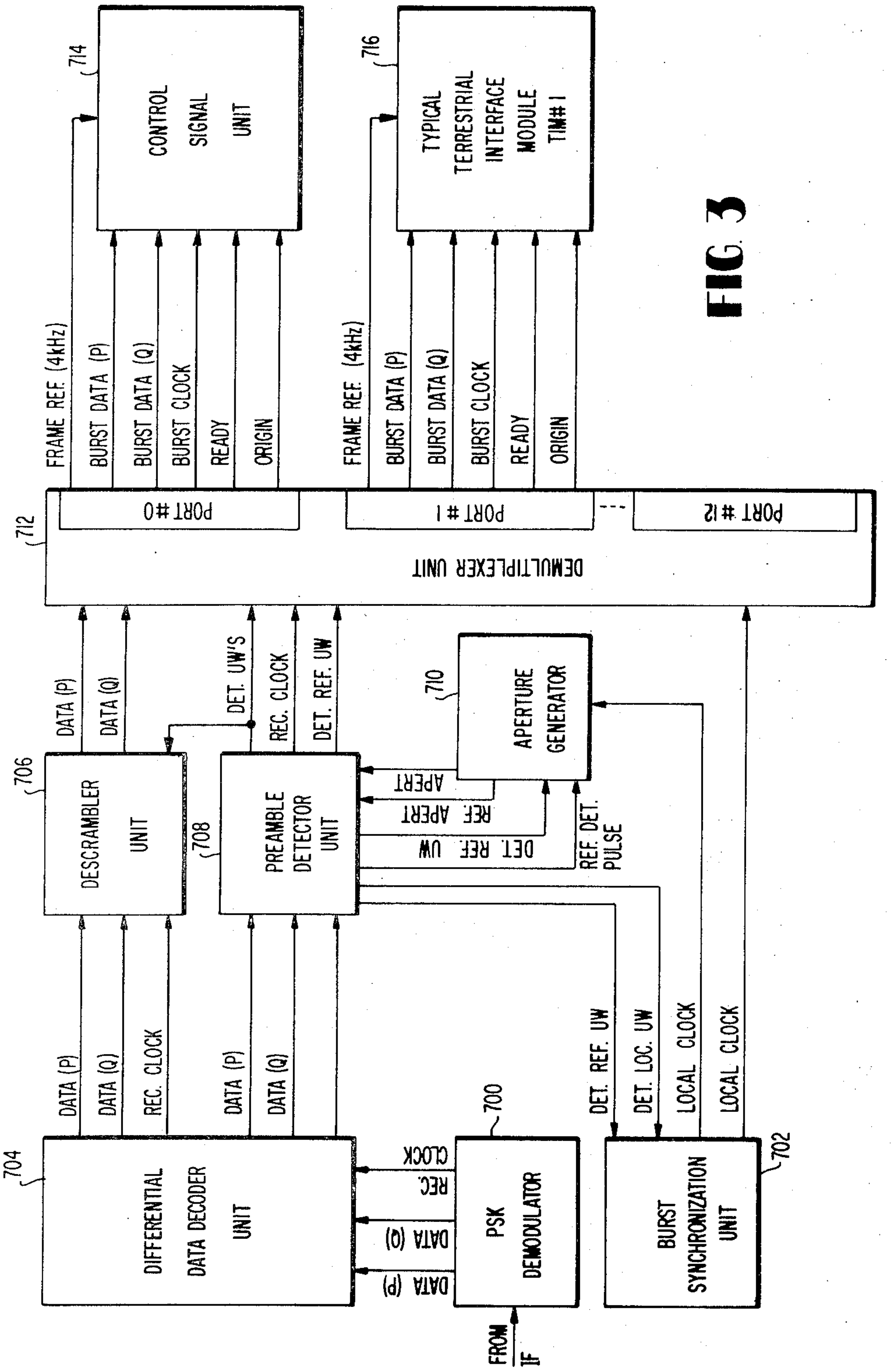
FIG. 3 is a block diagram of the receive side subsystem of a modular TDMA earth station.

A general block diagram of the receive side subsystem of the TDMA terminal is illustrated in FIG. 3. The signals received via the transponder on the satellite are applied, after being frequently down converted into an IF frequency, to the PSK demodulator 700. As is well known in the art, the PSK demodulator 700 recovers a clock signal from the incoming PSK modulated signals and also derives the P and Q data streams therefrom. The recovered clock as well as the P and Q data streams are applied to a differential decoder unit 704, which as is well known in the art, performs a function which is the complement of the function performed by the differential encoder unit at the transmit side of the subsystem. For every burst received, all symbols subsequent to the 20 bit unique word are descrambled by the descrambler unit 706 whose output is applied as an input to the demultiplexer unit 712. The descrambler unit 706 performs a function opposite to that of the scrambler unit in the transmit side subsystem. The data out of the differential data decoder unit 704 is also applied to the preamble detector unit 708 which is described in detail in the prior copending application. For present purposes, it is sufficient to understand that the preamble detector detects, inter alia, the reception of the complement of the regular unique words. The latter signal provides framing information for the signalling data as will be described in greater detail hereinafter.

The indication that a unique word has been detected by the preamble detector unit is also sent to an aperture generator 710 which provides a window or aperture to the preamble detector unit during which time the preamble detector unit 708 looks for the received unique words.

The demultiplexer unit 712, like the multiplexer unit in the transmit side subsystem, has thirteen ports, 0–12, which communicate with one control signal unit 714 and 12 TIM units 716. The data input to the demultiplexer unit consists of the data in the bursts selected by the earth stations. The demultiplexer operates to extract designated bursts and subbursts, or portions thereof, and to apply the extracted portions to the proper TIM unit or control signal unit. In addition to applying the proper data to a particular TIM unit, the demultiplexer also provides a burst clock to the TIM for the duration of the data portion, a ready signal which precedes the data portion, and a frame reference signal.

Figure 4:
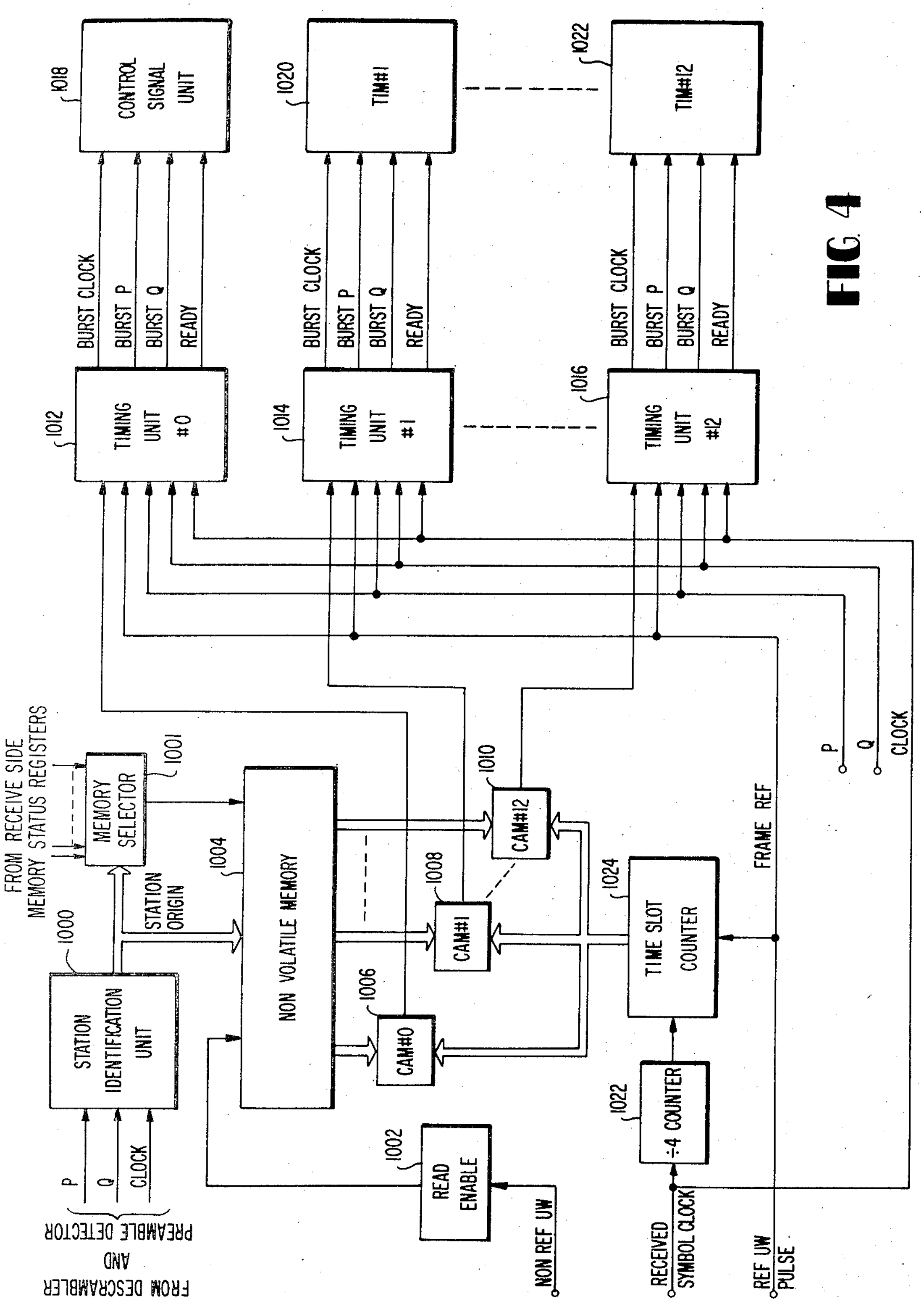
FIG. 4 is a block diagram of the demultiplexer of the receive side subsystem plus a means for selecting the sections of the demultiplexer memory.

An example of a demultiplexer unit for extracting the selected channels of data from the substantially continuous stream of received data and selectively applying portions of the data to the control signal unit and TIM units is illustrated in FIG. 4. As in the case of the multiplexer unit, the demultiplexer unit is controlled by words stored in a non-volatile memory. The non-volatile memory in the demultiplexer unit is 1004. However, unlike the case for the multiplexer, the non-volatile memory 1004 does not sequentially present output words to external means but rather is addressable by addresses corresponding to the burst origin.

As will be recalled from the above description, each burst contains a station identification code directly following the unique word. Since the position of all bursts is known, the origin of a burst can be determined by its position in the frame relative to the detected reference pulse. In the example described herein, an origin code is generated in a conventional manner on the basis of a prioriburst position information. The station identification address may be compared with the origin code to insure that the means for generating the origin code is in fact operating correctly. As shown in FIG. 4 the means for generating the origin code is the station identification unit 1000 which is a part of the common control subsystem.

The origin code addresses memory 1004 and causes non-destructive read out from the memory of a word which pertains solely to the burst from the origin station. The word comprises 13 fields for the particular example wherein the multiplexer has 13 input-output ports for connection to one control signal unit 1018 and 12 TIM units 1020. Each field identifies the beginning and ending time slots for one subburst within the burst from said origin station. The fields are compared, respectively, in content addressable memories 1006, 1008, and 1010, with the output from a time slot counter 1024 which accumulates time slots beginning with the start of the frame. In the particular example described herein a time slot is considered to be 8 bits or 4 symbols in length (corresponds to a conventional digital voice channel). The time slot counter 1024 is reset by the detected reference pulse from the preamble detector, and the time slot pulses which are accumulated by the counter 1024 are derived from the divide by four counter 1022 which, in turn, is pulsed by the symbol clock. There is a separate content addressable memory for every control signal unit and TIM unit. There is also a separate timing unit, e.g., timing units 1012, 1014, and 1016, for every control signal unit and TIM unit. At the proper time, under control of the words stored in memory 1004 and time slot counter 1024, a content addressable memory will provide start and stop outputs to its associated timing unit. The start and stop outputs turn on and off the respective timing unit to pass the received symbol clock and the received P and Q data to the respective control signal unit or TIM unit.

Although in the above description, it was pointed out that the demultiplexer selects whole subbursts for application to a particular control signal unit or TIM unit, it will be apparent that a subburst is not the smallest block of data which may be separately directed to a particular TIM unit. For example, any portion of a subburst may be directed individually to any TIM unit at any earth station. This is easily accomplished by having the word in the non-volatile memory 1004 define any desirable start and stop time slots within any given station's burst.

Flexibility is provided in that changing traffic patterns can be handled by merely changing the content of one or more words in memory 1004. The variation of words can easily be controlled directly or by a programmed data processor which varies the words at certain times where trafic changes are desirable or which responds to signals indicating the need for a change in assignment of subbursts.

In accordance with the present invention the memory 1004 is divided into two parts, active and stand-by. Both parts may be and preferably are identical. As described above, in response to an origin code, e.g. station B origin code, the memory 1004 will place bit fields in the content addressable memories 1006 through 1010 which represent the times for demultiplexing data in the received burst from station B. In the same manner the memory 1004 contains a separate 13 field word for each station which it can communicate with. All of these words will be in the active memory. Since the stand-by memory is organized in the same manner as the active memory, a different format for station B's burst can be properly multiplexed by putting a new program word in the "station B" address of the stand-by memory. A memory selector unit 1001 controls selection of the active or stand-by unit. As will be explained hereinafter, the control signal unit in the receiver, e.g. receiver of station C, will contain a receive side memory status register for each of station A, B, D and E. The register for station B for example indicates the status of the multiplexer memory at station B. Assuming that stations A, C, D and E have made no changes in their multiplexer memory status and that station B has switched to its stand-by memory, the memory selector in station C will function as follows. Whenever any of the bursts from stations A, D or E are received the origin code will pass the corresponding "0" bit from the respective receive side memory status register via selector 1001 to memory 1004. This has the effect of addressing the active portion of memory 1004. However, when a burst from station B is received, the origin code from unit 1000 will select the bit from the receive side memory status register for station B. Due to station B having switched to its other or stand-by memory, the bit in the latter register will be a "1" bit.

Consequently, during receipt of the burst from station B, the stand-by section of memory 1004 will be addressed by the station B origin code.

The manner in which a receiver detects the memory status of the transmitting stations and stores that information in the receive side memory status registers will be explained hereafter.

Figure 5:
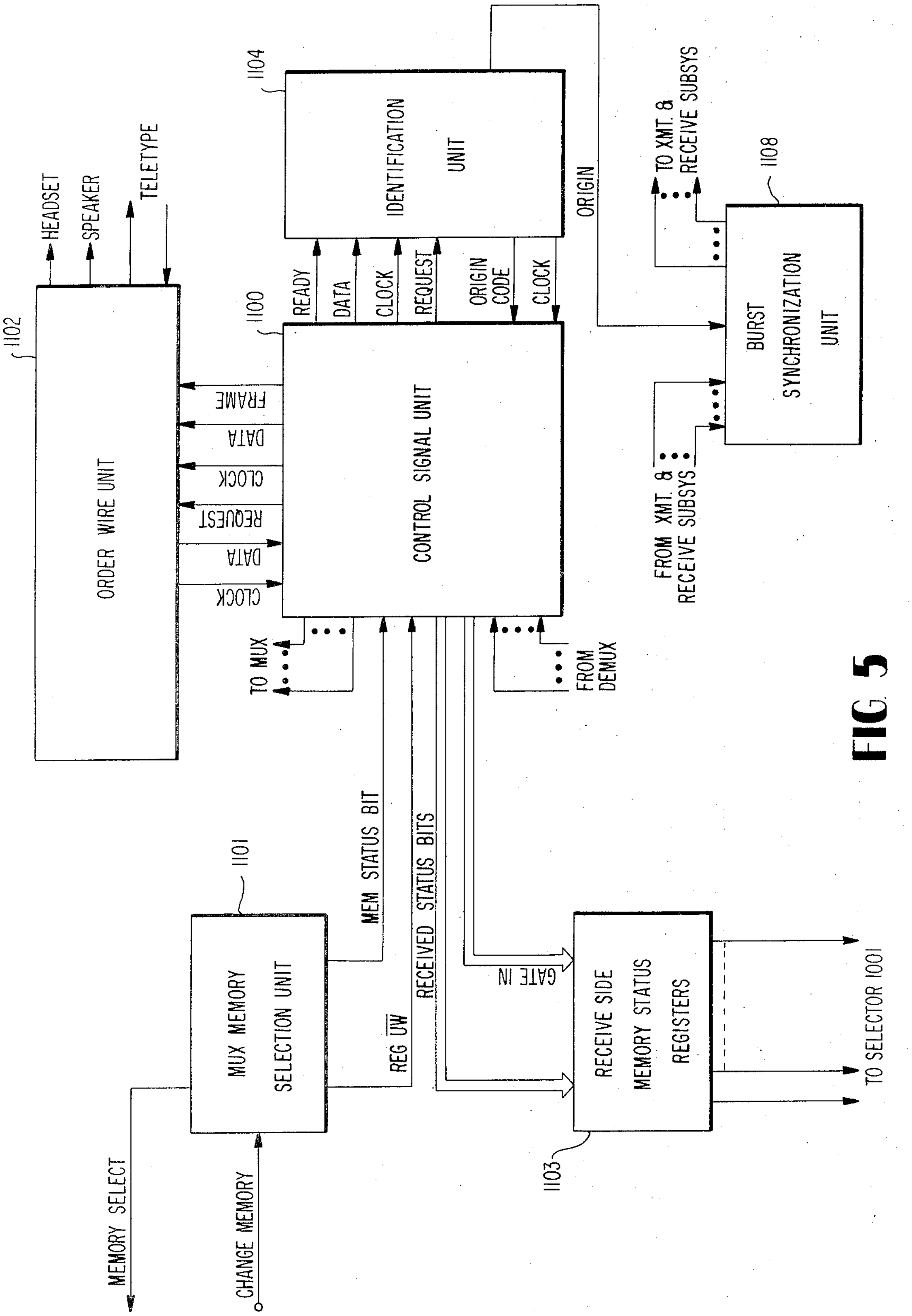
FIG. 5 is a block diagram of the control subsystem of a modular TDMA earth station.

A general block diagram of the control subsystem which provides control signals to the transmit subsystem and the receive subsystem is illustrated in FIG. 5. The control subsystem provides most of the control and housekeeping functions required within the TDMA system. These functions include (1) automatic burst acquisition and re-entry, (2) steady state burst synchronization, (3) burst or station identification via preordered burst location and/or detection of SIC codes, (4) teletype and voice order wire services, (5) centralized signalling data transmission for demand assigned operation deemed necessary, (6) control in spare data channel, (7) switching to and from reference station modes, and (8) redundancy switch over control.

These functions are performed by the order wire unit 1102, the control signal unit 1100, an identification unit 1104, a burst synchronization unit 1108, an automatic entry unit 1106, and, if desirable, a control processor not shown. A control processor is preferably included for flexibility purposes. For example, as described above, the words in the non-volatile memories of the multiplexer and demultiplexer may be varied in accordance with a program. The control processor may be the programmed device which varies the above-mentioned words. Furthermore, the control processor may be programmed to vary burst times of the respective earth stations and perform other functions. The control signal unit 1100 shown in FIG. 5 is the same control signal unit referred to previously which performs the conventional function of generating or receiving the signalling data and which appears to the multiplexer and demultiplexer as merely TIM unit. As is well known in the art, the control signal unit receives blocks of data from the order wire unit 1102, the identification unit 1104 and a control processor if one is used. The received data are formated into burst form at the symbol clock rate and supplied to the multiplexer in the previously described manner. On the receive side, the demultiplexer strips out of each incoming burst the SIC code, the control bits and the order wire data as a single block and delivers the block to the control signal unit. There the signals are reduced in clock rate and reformated for delivery to the identification unit, the order wire unit, and when applicable, to a control processor. The order wire unit 1102 may also be conventional and may provide teletype and voice audio wires. On the transmit side, the order wire signals are combined with the SIC code, and control bits in the control signal unit and the resulting block of data are applied to port 0 of the multiplexer. On the receive side the same signals from each burst are stripped out by the demultiplexer as explained above and provide from port 0 of the demultiplexer to the control signal unit. The station identification unit 1104 receives the SIC codes via the control signal unit and provides an output which indicates the origin of the currently received burst. The origin information is applied to a burst synchronization unit 1108. The function of a burst synchronization unit, as is well known in the art, maintains the earth station burst in proper synchronism with the frame reference and provides burst start or burst initiate signals to the transmit side subsystem.

In accordance with the present invention there is also provided a multiplexer memory selection unit 1101 and receive side memory status registers 1103. The unit 1101 comprises a plurality of flip flops 652, 654 and 656 shown in detail in FIG. 2. The receive side memory status registers 1103 are the registers, referred to above in connection with the description of FIG. 4, which provide status information to the demultiplexer.

In order to understand the operation of the present invention, further details of the signalling portion of the control signal unit must be explained. As is well known, the preamble of a burst includes, inter alia, four bits which are referred to as signalling bits. These bits may be, and for our example will be assumed to represent, order wire information. Typically, a complete signalling word is 32 bits long. Since only four bits are transmitted per burst it is apparent that the signalling word is submultiplexed over eight frames. The complement of the regular unique word, which in this example occurs once every eight frames, serves to provide framing information for the submultiplexing of the signalling word.

In accordance with the present invention, one bit of the signalling word is dedicated for use as a memory status bit. In the example to be described the bit position selected is the 20th bit position. When the first or active multiplexer memory is being used this bit is a zero bit. All other stations receive the signalling word from the transmitting station, e.g. station B, and store the status bit in a receive side memory status register.

Figure 6:
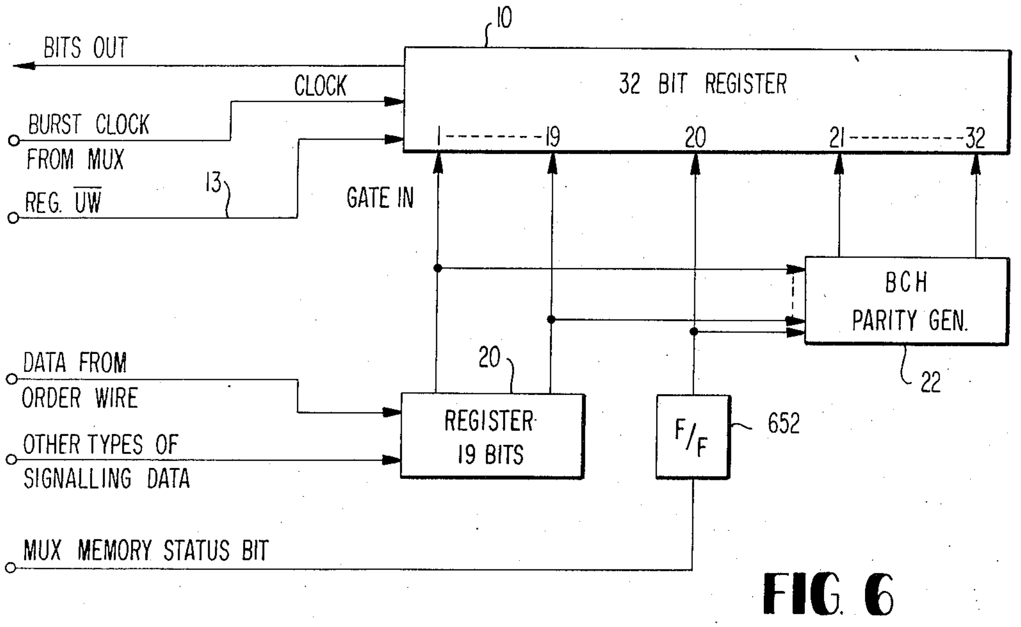
FIG. 6 is a block diagram of that portion of the control signal unit which organizes the signalling data for submultiplexing via the transmitted bursts.

FIG. 6 illustrates a portion of the control signal unit and a portion of the multiplexer memory selection unit which operates to transmit the signalling bits during the station's burst. The system shown is conventional except for the addition of flip flop 652 which is part of the multiplexer memory selection unit. Signalling bits, for example from the order wire unit are entered into a 19 bit register 20. The contents of register 20 and the single bit in flip flop 652 are applied to a BCH parity generator which generates 12 parity bits. Once every eight frames a gating signal appears on lead line 13 and gates the contents of register 20, flip flop 652, and BCH parity generator 22 into a 32-bit signalling word register 10. The gating signal may be any suitable submultiplexing framing signal. In the specific example herein it corresponds to output from a decoder 670 shown in FIG. 2. The decoder 670 is wired to provide an output gating pulse when the code select generator output indicates that the complement of the regular unique word is being generated. Since the code select generator provides that output code once every eight frames, the necessary submultiplexing framing is provided.

The register 10 responds to the burst gates and burst clocks from the multiplexer to serially shift out four bits of signalling data during the preamble portion of each burst from the transmitting station. The input to flip flop 652 may be a manually operated switch which is thrown when it is desired to change from active to stand-by memory. It will be noted that irrespective of the time at which the switch is actuated, the change of status will not be entered into the register until the start of a new eight frame signalling sequence. Assuming that the flip flop 652 normally contains a zero, representing the first or active section of the multiplexer memory, actuation of the aforementioned switch will place a 37 1" bit in flip flop 652.

The actual switching of memory sections takes place eight frames after the new status bit is entered into register 10. This is accomplished by the remainder of the multiplexer memory selection unit which is shown in detail in FIG. 2. The status bit is entered into flip flop 652 as soon as the manual switch is actuated. At the beginning of the next eight frame signalling sequence, the output from decoder 670 gates the status bit into the register 10 (in the control signal unit 604) and also gates the status bit into flip flop 654. At this time, flip flop 656 will still contain the old status bit "0" and the first or active section of memory 600 will still be controlling the format of the station's burst. Eight frames later another output from decoder 670 will gate the new status bit into flip flop 656 to thereby effect a election of the stand-by memory for controlling the burst format.

It should be noted that the new status bit is held in flip flop 652 until the memory selection is once again changed. This ensures that the status of the multiplexer memory will be continuously sent to the other stations in the TDMA system. Also, for the case where four phase PSK modulation is used, the 32 bit register 10 shown in FIG. 6 will consist of two parallel 16 bit registers. The first register will receive bits 1, 3, 5 . . . 31, and the second register will receive bits 2, 4, 6 . . . 32. Each symbol clock will shift both shift registers simultaneously. The outputs will go to the P and Q lines at the multiplexer output.

Figure 7:
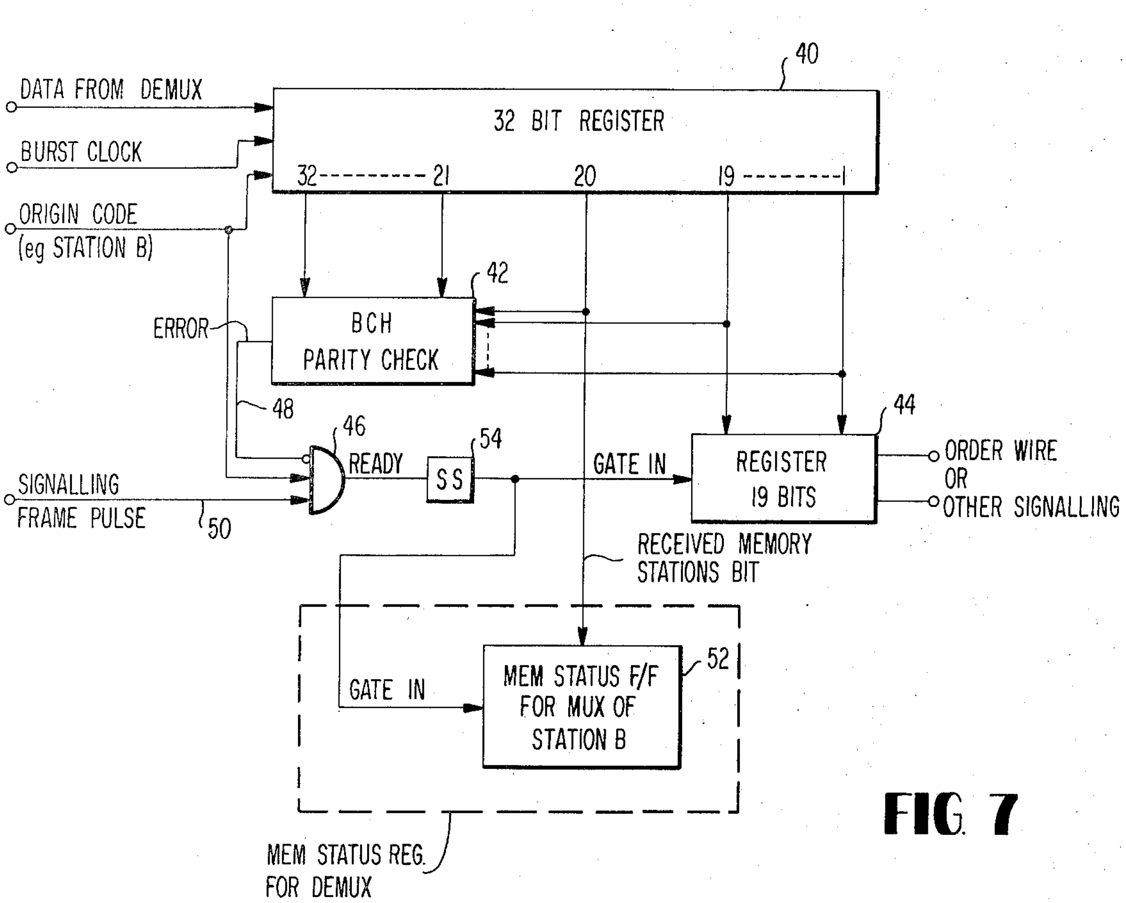
FIG. 7 is a block diagram of a portion of the control signal unit which receives the signalling data from remote stations.

The control signal unit also includes registers and apparatus for receiving the 32 bit signalling words from other stations. However, on the receive side separate apparatus is typically provided for receiving each of the signalling words from each of the other stations. As an example, FIG. 7 illustrates apparatus at station C for detecting the signalling word transmitted by station B. Similar apparatus is also provided for detecting signalling words from stations A, D and E.

The apparatus which is part of the control signal unit comprises a thirty-two bit shift register 40, a BCH parity check means 42, a 19 bit register 44 and a gate 46. Associated with the apparatus is a flip flop 52 which is one of the registers of the receive side memory status registers 1103 shown generally in FIG. 5. Flip flop 52 stores a "0" or "1" bit depending on the status of the multiplexer memory at station B. Flip flop 52 also controls, in the manner explained above, the selection of the active or stand-by section of the station C demultiplexer memory during the time that a burst from station B is being received.

In operation, the register 40 is loaded with data bit applied to the control signal unit by the demultiplexer only when the origin code detected by the station identification unit indicates station B as the origin. The other registers will be gated on by respective origin codes from the other stations. The bits in positions 1–19 of register 40 will be applied to register 44 and bit 20 will be applied to flip flop 52 but these bits will not be gated into register 44 and flip flop 52 until register 40 has been completely loaded with the signalling word.

Gating of bits into register 44 and flip flop 52 is controlled by a gate in pulse from signal shot 54 which is generated in response to a ready pulse at the output of gate 46. The latter gate is operative to generate the ready pulse every time a received burst from station B contains the complement of the regular unique word. As will be recalled the latter unique word serves as the submultiplexing framing signal and will occur in the station B burst preamble which contains the first four bits of a new signalling word.

The complement of the regular unique words is detected by the preamble generator (FIG. 3) and an output pulse indicating the detection of said unique word is applied as a signalling word framing pulse to the gate 46 of the control signal unit. The gating signal, from the station identification unit, indicating station B, is also applied to gate 46. When the latter two inputs to gate 46 occur and provided there is no error indication output from BCH parity check device 42, the gate 46 will provide a ready pulse output.

The BCH parity check means 42 continuously receives the bits in positions 1–20 of register 40, generates 12 bits of parity, and compares the twelve bits of generated parity with the bits in positions 21–32 of register 40. An error output will always be present until the correct signalling word appears in register 40.

The nineteen bits gated into register 44 are the signalling data bits, and in the particular example described herein, will be applied to the order wire unit in a conventional manner. The twentieth bit is applied to flip flop 52 which stores the status of a distant station's multiplexer memory and controls the status of the demultiplexer memory during reception of a burst from said distant station.

As in the case of FIG. 6, the register 40 will be two parallel 16 bit registers when four phase PSK modulation is used. One register will receive the bits from the P channel while the other will receive the bits from the Q channel.

It will be noted that the timing of the system described insures that all bursts transmitted will be properly demultiplexed. Assume for example an arbitrary burst number 500 was just transmitted from station B when a change memory command occurs. A status bit will be generated but will not enter the signalling word generator until the occurrence of the next station B burst which contains a complement of the regular unique word, e.g. burst 504. At burst 504 the status bit will be entered into the twentieth bit position of the transmitter signalling register. Because of submultiplexing the entire signalling word will be transmitted, four bits per burst, over bursts 504 through 511 (eight bursts). During this time the multiplexer memory has not changed its status and the format of bursts 500 through 511 will be the "old" format controlled by the "active" section of the multiplexer memory.

At the beginning of burst 512, the complement of the regular unique word will again be generated. This condition results in a change of the status of the multiplexer memory from "active" to "stand-by". Thus, bursts 512 and those following will have the "new" format which is controlled by the program in the stand-by section of the multiplexer memory.

At the receiver station, station C, the receive side memory status register, will initially include a bit indicating that station B multiplexer memory is operating under control of the "active" portion. This status bit will address the active portion of station C demultiplexer memory when station B bursts are received. By the time station B's burst 511 has been received, the signalling word register at station C will have a full station B signalling word with the new status bit stored therein. Thus far all received bursts will be demultiplexed by the "old" program. When burst 512 is received, the first part of it will result in a detection of the complement of the regular unique word. The latter detection loads a new status bit in the receive side memory status register thereby causing selection of the "stand-by" section of the demultiplexer memory. Thus bursts 512 and the following bursts will be demultiplexed by the "new" program which effectively complements the "new" program in station B's multiplexer memory.

It should be noted that although the terms "active" and "stand-by", "old" and "new" have been used herein, no special meaning is to be accorded those words. The memory sections could equally be described as sections 1 and 2, A and A', etc.

What is claimed is:

1. A TDMA communications system of the type in which multiple stations transmit bursts of communications in a time separated format, comprising, at a station, a memory means having at least two sections, for controlling the format of a burst of communications, means for selecting either one of said sections of said memory to control said format, means responsive to a burst format change command for entering a memory status signal in the transmitted burst from said station, and delay means responsive to said burst format change command for actuating said selecting means a fixed time after transmitting said memory status signal to cause said selecting means to change the selection of the memory section which controls said format.

2. A TDMA communications system as claimed in claim 1 wherein said means for entering comprises a. a register for holding a plurality of bits of information,
b. means for periodically entering new bits of information into said register,
c. means for transmitting successive bits from said register during the preamble time of each burst from said station, all said bits being transmitted via bursts during said period,
d. means responsive to said burst format change command for storing a signal representing the memory section to be selected, and
e. means for entering said stored signal into said register.

3. A TDMA communications system as claimed in claim 1 wherein said system is of the type which includes a signalling channel within the burst preamble of the transmitted bursts, said means for entering a memory status signal comprising, a. means for storing a status signal representing the section of said memory which is controlling the format of said burst,
b. means responsive to said burst format change command for changing the status signal in said storing means, and
c. means for including the signal from said storing means within the signalling channel of the transmitted bursts.

4. A TDMA communications system as claimed in claim 1 further comprising, a. means for receiving bursts of communications from remote stations,
b. memory status register means for detecting and storing status signals in said received bursts representing selection of memories at said remote stations,
c. memory means for controlling the demultiplexing of said received bursts, and
d. addressing means responsive to said status signals in said memory status register for addressing said last mentioned memory means.

5. A TDMA communications system as claimed in claim 3 further comprising, a. means for receiving bursts of communications from remote stations,
b. memory status register means for detecting and storing status signals in said received bursts representing selection of memories at said remote stations,
c. memory means for controlling the demultiplexing of said received bursts, and
d. addressing means responsive to said status signals in said memory status register for addressing said last mentioned memory means.

6. A TDMA satellite communications system comprising, a. a plurality of information means adapted to store blocks of information,
b. a control signal unit for generating and storing blocks of control signal information,
c. memory means having first and second sections therein adapted to store programming information,
d. means for periodically reading out the programming information from one of said first and second sections, said latter means including a memory section selection means,
e. means responsive to said program read out from said memory for extracting information from said information means and control signal unit, and
f. means for transmitting said extracted information,
g. said control signal unit comprising
   i. means for storing a status signal representing the section of said memory which is being selected by said memory section selection means,
   ii. means responsive to said storage means for including said status signal in said block of control signal information, and
   iii. means responsive to a command signal for changing the contents of said storing means to indicate the other of said memory sections, and
h. means responsive to a changed status signal in said storing means for causing said memory section selection means to select said other memory section a fixed period of time following the entry of said changed status signal into said block of control signal information.

7. A TDMA satellite communications system as claimed in claim 6 further comprising, a. means for receiving bursts of communications from remote stations, each said burst including a preamble portion and data portion, said preamble portion including a block of control signal information including a status signal representative of the status of a memory at the remote location which transmitted said burst, b. a second memory having a plurality of programs therein, c. means responsive to said receiving means for detecting the origin of each of said received bursts, d. said control signal unit further comprising i. means for detecting and storing said received status signals, said status signals emanating from each remote station being separately stored, e. means responsive to said stored status signals in said latter means and said origin detecting means for selecting a program in said second memory in dependence upon the origin of the burst being received and the status of the memory at said origin station, and f. demultiplexing means for separating out blocks of information in said received burst in response to and in accordance with said selected program in said second memory.

8. A TDMA satellite communications system as claimed in claim 6 wherein said control signal unit further comprises, a. parallel input serial output register means for holding a predetermined number of information bits corresponding to said block of control signal information, b. means including said means responsive to said status signal storage means for periodically entering said block of control signal information, including said status signal, into said parallel input serial output register.

9. A TDMA satellite communications system as claimed in claim 8 wherein said means for extracting information comprises means for extracting a fixed number of information bits from said parallel input serial output registers each time said program is read out, said fixed number and said period for entering said bits of information being so related that all of said information bits are extracted during said period.

10. A TDMA satellite communications system as claimed in claim 9 wherein said means for storing said status signal comprises a single bit register and said status is a single bit, and wherein said means for entering said block of control signal information comprises a gating connection means for entering said single status bit into a fixed position of said parallel input serial output register.

11. A TDMA satellite communcations system as claimed in claim 10 further comprising a timing means for generating first framing signals having a period equal to said period of reading out said memory and second framing signals having a period which is a substantial multiple of said first period and wherein said means for periodically reading out the programming information is responsive to said first framing signals and wherein said means for periodically entering said block of control information is responsive to said second framing signals.

12. A TDMA satellite communcations system as claimed in claim 11 wherein said memory station selection means comprises, a second single bit register having an output which addresses the section of said memory in accordance with the single bit stored therein, and wherein said means for causing said memory section selection means to select said other memory section after a fixed time delay comprises gating means responsive to said second framing signals for gating the status signal bit held in said first single bit register into said second single bit register, whereby said delay time is equal to the period of said second framing signals.

13. A TDAMA satellite communications system as claimed in claim 7 wherein every nth preamble from each station includes a submultiplexing framing signal, and wherein said system further comprises means for detecting said received submultiplexing framing signals.

14. A TDMA satellite communications system as claimed in claim 13 wherein said means for detecting and storing said received status signals comprises a separate means for detecting and storing status signals received from separate remote stations, respectively, each said separate means comprising, a. serial in parallel out register means for receiving and storing the bits of said control signal information contained in the burst from a given remote location, b. a single bit receive side memory storage register, c. means responsive to said detected submultiplexing framing signals in a burst from said given remote location entering a bit held in a fixed position of said serial in parallel out register into said single bit receive side memory storage register, whereby said latter storage register holds a status signal bit which represents the memory section selection at said remote location.

15. A TDMA satellite communications system as claimed in claims 12 wherein every *nth* preamble from each station includes a submultiplexing framing signal, and wherein said system further comprises means for detecting said received submultiplexing framing signals.

16. A TDMA satellite communications system as claimed in claim 15 wherein said means for detecting and storing said received status signals comprises separate means for detecting and storing status signals received from separate remote stations, respectively, each said separate means comprising, a. serial in parallel out register means for receiving and storing the bits of said control signal information contained in the bursts from a given remote location, b. a single bit receive side memory storage register, c. means responsive to said detected submultiplexing framing signals in a burst from said given remote location for entering a bit held in a fixed position of said serial in parallel out register into said single bit receive side memory storage register, whereby said latter storage register holds a status signal bit which represents the memory section selection at said remote location.

17. A TDMA satellite communications system as claimed in claim 16 wherein the period of said submultiplexing framing signals from any given remote station is the same as the period of said second framing signals.

* * * * *

UNITED STATES PATENT OFFICE
CERTIFICATE OF CORRECTION

Patent No. 3,816,666 Dated June 11, 1974

Inventor(s) Atsushi Tomozawa et al

It is certified that error appears in the above-identified patent and that said Letters Patent are hereby corrected as shown below:

IN THE SPECIFICATION:

Column 1, line 24 - delete "Tnus" and insert -- Thus --
line 33 - delete "170,707" and insert --170,797 --

Column 2, line 64 - delete "porper" and insert -- proper --

Column 5, line 55 - after "through" insert -- to --

Column 8, line 32 - after "burst" delete "forward" and insert -- format --

Column 9, line 2 - delete "hereinafter" and insert -- hereafter --
line 44 - delete "prioriburst" and insert -- priori burst --

Column 11, line 63 - delete "provide" and insert -- provided --

Column 13, line 5 - delete "37 1" and insert --"1" --
line 37 - delete "32" and insert -- thirty-two --
line 47 - delete "19" and insert -- nineteen --
line 58 - delete "bit" and insert -- bits --

Signed and sealed this 8th day of October 1974.

(SEAL)
Attest:

McCOY M. GIBSON JR.
Attesting Officer

C. MARSHALL DANN
Commissioner of Patents